United States Patent [19]

Curnutt

[11] 4,126,302
[45] Nov. 21, 1978

[54] HORIZONTAL INERTIA-RESPONSIVE SHOCK ABSORBER

[76] Inventor: Charles R. Curnutt, 75992 Baseline, 29 Palms, Calif. 92277

[21] Appl. No.: 871,000

[22] Filed: Jan. 20, 1978

[51] Int. Cl.² .............................................. F16F 9/19
[52] U.S. Cl. ................................... 267/8 D; 267/136
[58] Field of Search ....................... 188/1 B, 280, 282; 267/8 D, 22 R, 64 B, 136

[56] References Cited
U.S. PATENT DOCUMENTS 1,744,332  1/1930  Paton et al. .......................... 267/8 D
3,659,835  5/1972  Peterson ............................... 267/136

Primary Examiner—Duane A. Reger
Attorney, Agent, or Firm—Ralph B. Pastoriza

[57] ABSTRACT

The shock absorber is designed to be horizontally mounted on a vehicle and incorporates a weight responsive to acceleration and deceleration forces developed by the vehicle itself. The arrangement is such that the weight will decrease the damping hydraulic fluid resistance under accelerating conditions and increase the hydraulic damping fluid resistance under decelerating conditions.

5 Claims, 6 Drawing Figures

HORIZONTAL INERTIA-RESPONSIVE SHOCK ABSORBER

This invention relates generally to shock absorbers for vehicles and more paricularly to an inertia-responsive shock absorber arranged to be horizontally mounted for absorbing rear wheel shocks of a motorcycle.

BACKGROUND OF THE INVENTION

In my U.S. Pat. No. 3,990,687 issued Nov. 9, 1976 and entitled SHOCK ABSORBER WITH CONTROLLED FLUID BYPASS MEANS there is disclosed a shock absorber in which the control of fluid bypassed from one side of a piston head to the other working within a cylindrical casing is achieved by caging the piston head and the fluid bypass control elements so that proper alignment will always be realized. The shock absorber disclosed is primarily for use on motorcycles and is more or less vertically oriented to absorb bumps and other similar shocks.

In the case of certain vehicles, particularly motorcycles, when the same are rapidly accelerated, the weight of the rider and the rapid acceleration combine to increase the load on the rear wheel. With this increased load, a rapid series of small shocks will result in the piston head and piston rod working further into the hydraulic cylinder against the bias of the external spring. In other words, the damping against return movement is too great to permit complete return of the piston within the time between successive rapid shocks. When the vehicle rapidly decelerates, the load as a consequence of the weight of the driver tending to be thrown forwardly is taken on the front wheel and is decreased on the rear wheel with the result that the piston head and piston rod work further out from the cylinder under the bias of the external spring. This latter action is often referred to in the art as "pumping down". If large bumps or sudden shocks during either acceleration of decelerating conditions occur, with the piston head of the shock absorber closer to one end or the other rather than in the desirable central position, it may seat with substantial impact against one or the other of the ends of the cylindrical casing.

It would be desirable to provide some type of fluid bypass flow control which would effectively decrease the resistance to damping fluid flow from one side of the piston head to the other under accelerating conditions and increase this resistance under decelerating conditions. Such an arrangement would then avoid the risks of impacting of the piston head with one end or the other end of the cylindrical casing under accelerating or decelerating conditions when a sudden bump or shock occurs.

BRIEF DESCRIPTION OF THE PRESENT INVENTION

Bearing the foregoing in mind, the present invention contemplates an improved shock absorber incorporating just such a means for controlling the fluid bypass resistance under accelerating and decelerating conditions of the vehicle upon which the shock absorber is mounted.

More particularly, the shock absorber of this invention is mounted horizontally or substantially horizontally and a weight slidable along the piston rod in the interior of the cylindrical casing is provided. The arrangement is such that the inertia of the weight under accelerating and decelerating conditions of the vehicle will result in its moving away from or closer to the piston head in such a manner as to vary the effective resistance to hydraulic fluid flow from one side of the piston head to the other.

Thus, the shock absorber of this invention includes a cylinder for holding hydraulic fluid with a piston reciprocable between first and second ends of the cylinder and including passage means for bypassing hydraulic fluid from one side of the piston to the other. A piston rod secured to the piston head passes out the second end of the cylinder and an external spring is provided between the extending end of the piston rod and the first end of the cylinder biasing the piston towards the second end. A weight is slidably mounted on the piston rod within the cylinder between the piston and the second end, this weight being responsive to acceleration of the vehicle on which the shock absorber is mounted to move away from the piston and uncover the fluid passage means to thereby decrease the resistance to fluid flow from one side of the piston to the other. Similarly, the weight is responsive to deceleration of the vehicle to move against the piston thereby effectively covering the fluid passages so that the resistance to fluid flow from one side of the piston to the other is increased.

It will be appreciated from the foregoing that for such an inertia responsive shock absorber to function properly, it should be mounted in an horizontal position with the axis of the shock absorber extending generally in a forward and rearward direction.

BRIEF DESCRIPTION OF THE DRAWINGS

A better understanding of this invention will be had by now referring to the accompanying drawings in which.

DETAILED DESCRIPTION OF THE INVENTION

Figure 1:
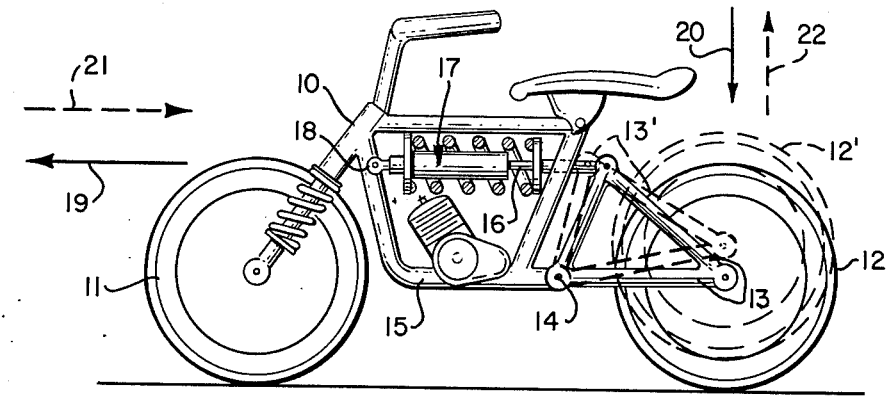
FIG. 1 is a side elevational view of a motorcycle incorporating the horizontal inertia responsive shock absorber of this invention.

Referring first to FIG. 1, there is shown a conventional motorcycle 10 provided with front and rear wheels 11 and 12. In addition to the normal resilient mounting (not shown) there is provided a strut network 13 supporting the rear wheel 12 and pivoted as at 14 to a rear portion of the motorcycle frame 15. An upwardly spaced portion 16 of the strut assembly 13 in turn connects to one end of a horizontally disposed shock absorber designated generally by the numeral 17. The other end of the shock absorber connects at 18 to the motorcycle frame 15.

With the foregoing arrangement, up and down movement of the rear wheel 12; for example, between the solid line position and dotted line position indicated at 12' will be absorbed by the shock absorber 17, the point of connection 16 moving essentially in a horizontal back and forth direction as a result of the pivoting of the strut assembly 13 to the frame as at 14. In other words, the strut assembly 13 functions essentially as a bell crank so that the up and down motion of the rear wheel is essentially converted to a horizontal back and forth motion for absorption by the horizontally disposed shock absorber.

In addition to the normal loads experienced by the wheels of the motorcycle, under rapid accelerating conditions of the motorcycle in a forward direction as indicated by the solid arrow 19 the inertia of the motorcycle driver on the seat and the massive elements of the motorcycle itself will tend to increase the downward force exerted by the wheel 12 on the ground, this downward force being indicated by the vertical solid arrow 20.

On the other hand, if the motorcycle rapidly decelerates as indicated by the dashed arrow 21, the weight of the motorcycle driver and massive portions of the motorcycle itself tend to be thrown forwardly about the axis of the front wheel 11 thereby decreasing the downward force or loading on the rear wheel 12. This decrease in loading is indicated by the vertical dashed arrow 22 in FIG. 1.

The result of the foregoing established forces indicated by the arrows 20 and 22 during acceleration and deceleration of the vehicle is that the external spring for the shock absorber 17 will reposition the normal piston head within the cylindrical casing away from its desirable center position and closer to one or the other of the ends of the casing. As a result, and as described heretofore, any sudden bumps or shocks during acceleration or deceleration can cause a serious impact of the piston head within the cylindrical casing against one or the other ends of the casing.

The tendency for the piston head within the cylindrical casing 17 to reposition itself closer to one or the other ends of the casing during acceleration or deceleration is minimized in accord with the present invention by varying the damping resistance of the hydraulic fluid to movement of the piston head.

Figure 2:
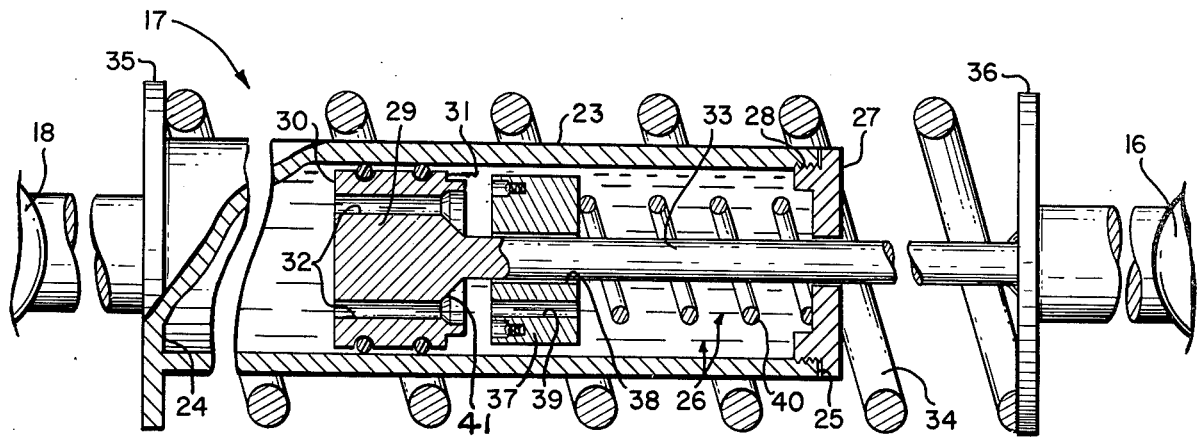
FIG. 2 is an enlarged cut-away view partly in cross section of the shock absorber of FIG. 1.

The manner is which the foregoing is accomplished will now be evident by referring to FIG. 2 showing the shock absorber 17 in FIG. 1 in an enlarged cut-away view.

As shown in FIG. 2, the shock absorber 17 includes a cylindrical casing 23 having a first closed end 24 and a second open end 25 for receiving hydraulic fluid 26. When the cylinder 23 is filled with fluid, the open end 25 is closed by an end cap 27 as by threading the same at 28 to this open end.

A piston head 29 is reciprocably movable in the casing towards and away from the first closed end 24. This piston head has a first side 30 facing the first closed end 24 and a second side 31 facing the end cap 27. Appropriate fluid passage means is provided by holes 32 passing from the first side 30 to the second side 31 of the piston head 29 so that hydraulic fluid is forced to pass through these openings upon reciprocating movement of the piston head.

Movement of the piston head 29 is controlled by a piston rod 33 secured to the second side 31 of the piston and extending centrally through the threaded end cap 27 to the exterior of the casing.

Surrounding the cylindrical casing 23 is an external spring 34 disposed between appropriate end plates 35 and 36 secured to the first end 24 of the cylinder and the extending end portion of the piston rod 33 respectively. The horizontal mounting of the shock absorber is shown by the connection points at the opposite ends at 16 and 18 in FIG. 2 corresponding to these points described in FIG. 1.

Still referring to FIG. 2, there is shown a cylindrical weight 37 disposed between the second side 31 of the piston head and the end cap 27. This weight includes an axial bore 38 through which the piston rod 33 passes. This bore is of a larger inside diameter than the outside diameter of the rod. The cylindrical weight itself has an outside diameter less than the inside diameter of the cylindrical casing 23. As a consequence, the weight 37 is free to slide horizontally along the piston rod 33.

In the particular embodiment illustrated in FIG. 2, the weight 37 is provided with a single hole 39 radially spaced from the axis of the piston rod 33 as shown. Further, there is provided an internal spring 40 between the weight 37 and the end cap 27 biasing the weight towards the second side 31 of the piston head 29.

Figure 3:
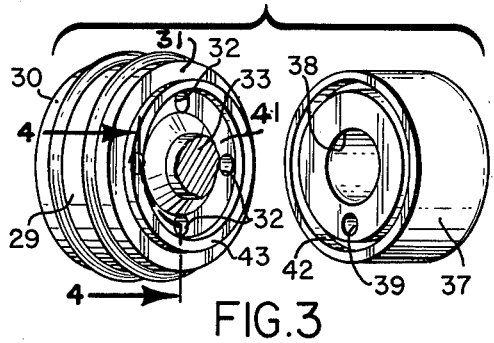
FIG. 3 is an exploded perspective view of the two basic control elements within the cylindrical casing of the shock absorber of FIG. 2.

Referring to the exploded perspective views of FIG. 3, there is shown more clearly the second side 31 of the piston head 29 wherein it will be noted that there are provided four holes 32 equally radially spaced from the axis of the piston rod 33. The second side 31 of the piston head further includes an annular groove 41 connecting the end openings of the holes 32. Essentially, this annular groove 41 will place all of the holes 32 in communication with the single hole 39 in the weight 37 when the weight bears against the second side 31 of the piston head.

Also illustrated in FIG. 3 is a cushioning means for cushioning contact of the weight 37 against the second side 31 of the piston head. In the particular embodiment disclosed, this cushioning means takes the form of an outer annular groove 42 at the extreme margin of the facing side of the weight 37 positioned to receive in a dash-pot like manner an annular ridge 43 formed on the second side 31 of the piston head.

Figure 4:
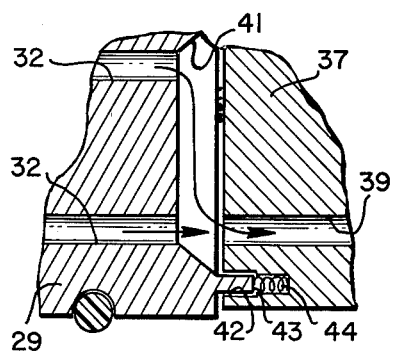
FIG. 4 is an enlarged fragmentary cross section taken along the arcuate section line 4—4 of FIG. 3.

Referring to the enlarged fragmentary view of FIG. 4 taken along the arcuate section line 4—4 of FIG. 3 when the weight 37 is up against the second side 31 of the piston head 29, the communication provided by the annular groove 41 for the holes 32 with the single hole 39 will be evident. Further, the manner in which the annular ridge 43 is received within the outer annular groove 42 is illustrated, there being provided sufficient clearance that fluid in this outer annular groove will be forced out by entrance of the annular ridge 43 in such a manner that it passes about the exterior sides of the ridge providing the desired dash-pot like action. To facilitate separation of the weight 37 from the piston head, there are provided three or more small springs on the floor of the outer annular groove 42, one of which is indicated at 44 in FIG. 4 pushing against the forward surface of the annular ridge 43.

It should be understood that the above-described structure constitutes only one type of cushioning means and that any equivalent cushioning means could be employed to cushion the impacting of the weight 37 against the second side 31 of the piston head.

OPERATION

Figure 5:
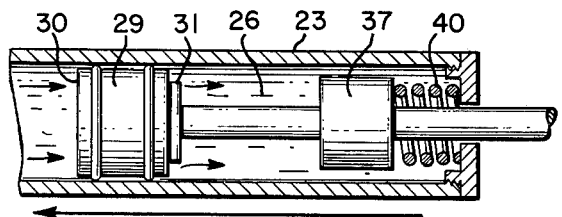
FIG. 5 is a schematic shown of the relative positions of control elements within the cylinder under accelerating conditions; and, FIG. 6 is a view similar to FIG. 5 but showing the relative positions of the control elements under decelerating conditions.
Figure 6:
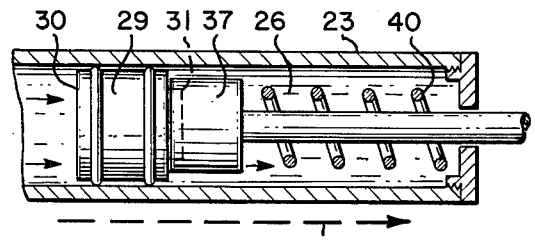

The operation of the horizontal shock absorber can best be understood be referring to the schematic diagrams of FIGS. 5 and 6.

Initially, it will be understood that the external spring 34 described in FIG. 2 exerts a sufficient bias force urging the piston rod 33 outwardly so as to balance the dead weight of the motorcycle and rider when seated thereon which is reflected by an inward push on the piston rod 33 through the strut assembly 13 described in FIG. 1. Under this equilibrium condition, the piston head 29 is disposed mid-way between the first and second ends of the cylindrical casing 23. Under normal riding conditions assuming the motorcycle is travelling at a constant speed, the internal spring 40 will normally bias the weight 37 against the second side 31 of the piston head 29, small bumps and shocks resulting in rapid back and forth movements of the piston head 29 and bypassing of the hydraulic fluid through the holes 32 in a back and forth manner. In fact, this back and forth motion of the hydraulic fluid through the holes 32 will tend to hold off the weight 37 slightly from continuous direct engagement with the second side 31 of the piston head even though the weight 37 is biased by the internal spring 40 to bear against this side.

Considering now conditions where the motorcycle is rapidly accelerating forwardly as depicted by the horizontal solid line arrow 19 in FIG. 1 and repeated by the same arrow 19 shown in FIG. 5, the inertia of the weight 37 will tend to cause it to remain stationary with respect to the ground so that the piston head 29 and cylindrical casing 23 along with the motorcycle and rider pull away from the weight 37. The result is that the weight 37 separates from the second side 31 of the piston head 29 as depicted in FIG. 5 compressing the internal spring 40. The spring constant of the internal spring 40 is carefully chosen so that a sufficient movement of the weight 37 away from the second side of the piston head 29 takes place to minimize the resistance of hydraulic fluid flow through the holes in the piston head from the first side to the second side. In other words, with the weight 37 in the position illustrated in FIG. 5, there is the least damping resistance to back and forth movement of the piston head 29 by the hydraulic fluid. The piston head 29 can thus rapidly reassume its central position in the cylindrical casing and will not tend to work towards the second end of the casing which could result if the hydraulic flow of fluid through the bypass passages was in any way impeded.

After acceleration ceases and the motorcycle is travelling at constant speed, the spring 40 will return the weight 37 to a position closely adjacent to the second side 31 of the piston 29 and normal damping of shocks will ensue, the fluid being bypassed through the holes 32 and single opening 39 in the weight as indicated by the arrows in FIG. 4.

Referring now to FIG. 6, there is repeated the dashed arrow 21 indicating a rapid deceleration in an horizontal direction. Under these conditions, again because of the inertia of the weight 37, it will tend to remain stationary while the piston head 29 and cylindrical casing 23 are decelerated resulting in the weight 37 moving against the second side 31 of the piston head 29 to cover the ends of the holes 32 at this second side. Under these conditions and as depicted in FIG. 6, maximum resistance to the bypassing of fluid from the first to the second side of the piston head 29 results, the majority of the fluid being forced through the single hole 39 in the weight 37. The tendency for the piston head 29 to thus "pump downwardly" is inhibited because of the greatly increased hydraulic resistance to this movement of the piston head as a result of the position of the weight 37.

From the foregoing, it will be evident that the present invention thus provides a means responsive to acceleration and deceleration to vary the damping resistance of the hydraulic fluid thereby overcoming positioning problems associated with prior art shock absorbers.

I claim:

1. An horizontally disposed inertia-responsive shock absorber, including, in combination:
   (a) a cylinder for holding hydraulic fluid;
   (b) a piston reciprocable between first and second ends of said cylinder and including passage means for bypassing fluid from one side of the piston to the other;
   (c) a piston rod secured to said piston and passing out the second end of the cylinder;
   (d) an external spring between the extending end of said piston rod and the first end of said cylinder biasing said piston towards said second end; and
   (e) a weight slidably mounted on said piston rod in said cylinder between said piston and said second end, said weight being responsive to acceleration of a vehicle on which said shock absorber is horizontally mounted to move away from said piston and responsive to deceleration of said vehicle to move against said piston to thereby vary the resistance to hydraulic fluid flow from one side of said piston to the other.

2. A shock absorber according to claim 1, including an internal spring in said cylinder biasing said weight towards said piston.

3. A shock absorber according to claim 1, including cushioning means between said weight and piston for cushioning the contact between said weight and piston when said weight moves against said piston.

4. An horizontally disposed inertia responsive shock absorber including, in combination:
   (a) a cylindrical casing having a first closed end and a second open end for receiving hydraulic fluid;
   (b) an end cap threaded receivable on said second open end;
   (c) a piston head reciprocably movable in said casing towards and away from said first closed end, a first said of said piston head facing said first end and a second side facing said end cap, said piston head havng fluid passage means from said first side to said second side;
   (d) a piston rod secured to said second side of said piston head and extending centrally through said threaded end cap to the exterior of said casing;
   (e) an external spring surrounding said casing between said first closed end and the extending end of said piston rod to bias said piston head away from said first closed end;
   (f) a cylindrical weight in said cylindrical casing between said second side of said piston head and said end cap, said weight having an axial bore through which said piston rod passes, said bore being of larger inside diameter than the outside diameter of said rod and said weight having an outside diameter less than the inside diameter of said casing so that said weight is free to slide horizontally along said piston rod;

(g) an internal spring positioned between said weight and said end cap biasing said weight towards said piston head to cover the outlet of said fluid passage means at said second side of said piston head; and (h) cushioning means on said weight and piston head for cushioning the contact between said weight and piston head when said weight moves against said piston head whereby when a vehicle upon which said shock absorber is horizontally mounted is accelerating rapidly, said weight moves away from said piston head to allow for minimum resistance to hydraulic fluid flow between said first side and second side of said piston, and whereby when said vehicle is rapidly decelerating, said weight moves against said first side of said piston head to thereby provide a maximum resistance to hydraulic fluid flow between said first side and second side of said piston.

5. A shock absorber according to claim 4, in which said fluid passage means includes a plurality of holes in radially spaced relationship to the axis of said piston rod, said second side of said piston head including an annular groove connecting the end openings of said holes, said weight including a single hole radially spaced from said piston rod in a position to register with said annular groove regardless of the rotative position of said weight on said piston rod so that said holes in said piston head are in communication with said single hole in said weight when said weight is against said second side of said piston head.

* * * * *